United States Patent [19]
Inoue

[11] Patent Number: 6,031,670
[45] Date of Patent: *Feb. 29, 2000

[54] WIDE-ANGLE LENS

[75] Inventor: Toshiyuki Inoue, Nagano, Japan

[73] Assignee: Sankyo Seiki Mfg. Co., Ltd., Nagano-ken, Japan

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/757,192

[22] Filed: Nov. 27, 1996

Related U.S. Application Data

[63] Continuation-in-part of application No. 08/590,725, Jan. 24, 1996, abandoned, which is a continuation of application No. 08/251,623, May 31, 1994, abandoned, which is a continuation of application No. 07/738,854, Jul. 31, 1994, abandoned.

[30] Foreign Application Priority Data

Aug. 28, 1990 [JP] Japan ................... 2-225975

[51] Int. Cl.⁷ ........................... G02B 13/18
[52] U.S. Cl. ............. 359/717; 359/739; 359/793
[58] Field of Search ................. 359/642–648, 359/664, 670, 708, 713–717, 744–753, 793

[56] References Cited

U.S. PATENT DOCUMENTS

| | | | |
|---|---|---|---|
| 2,889,745 | 6/1959 | Hayes et al. | 359/793 |
| 3,511,558 | 5/1970 | Uberhagen | 359/739 |
| 4,593,984 | 6/1986 | Kimura et al. | 359/717 |
| 4,674,844 | 6/1987 | Nishioka et al. | 359/708 |
| 4,702,569 | 10/1987 | Hercado et al. | 359/793 |
| 4,720,183 | 1/1988 | Dilworth | 359/643 |
| 4,747,675 | 5/1988 | Nagler | 359/643 |
| 4,760,452 | 7/1988 | Kaneko et al. | 348/340 |
| 4,806,001 | 2/1989 | Okabe et al. | 359/708 |
| 4,865,435 | 9/1989 | Cho | 359/716 |
| 4,896,217 | 1/1990 | Hiyazawa et al. | 348/342 |
| 4,906,078 | 3/1990 | Iuabata et al. | 359/676 |
| 5,005,955 | 4/1991 | Ohshita | 359/676 |
| 5,508,848 | 4/1996 | Inoue | 359/717 |

FOREIGN PATENT DOCUMENTS

| | | | |
|---|---|---|---|
| 3346785 | 6/1982 | Germany | 359/708 |
| 93116 | 7/1980 | Japan | 359/717 |
| 247213 | 12/1985 | Japan | 359/717 |
| 91618 | 5/1986 | Japan | 359/717 |
| 55511 | 3/1988 | Japan | 359/793 |

*Primary Examiner*—Thong Nguyen
*Attorney, Agent, or Firm*—McAulay Nissen Goldberg Kiel & Hand, LLP

[57] ABSTRACT

The present invention is directed toward a wide-angle lens. Because of a small quantity (two) of lens elements, the wide-angle lens facilitates size and weight reduction and permits low-cost manufacture. The lens is made from plastic, which permits further cost reduction. The lens is particularly useful when employed in CCD cameras.

15 Claims, 7 Drawing Sheets

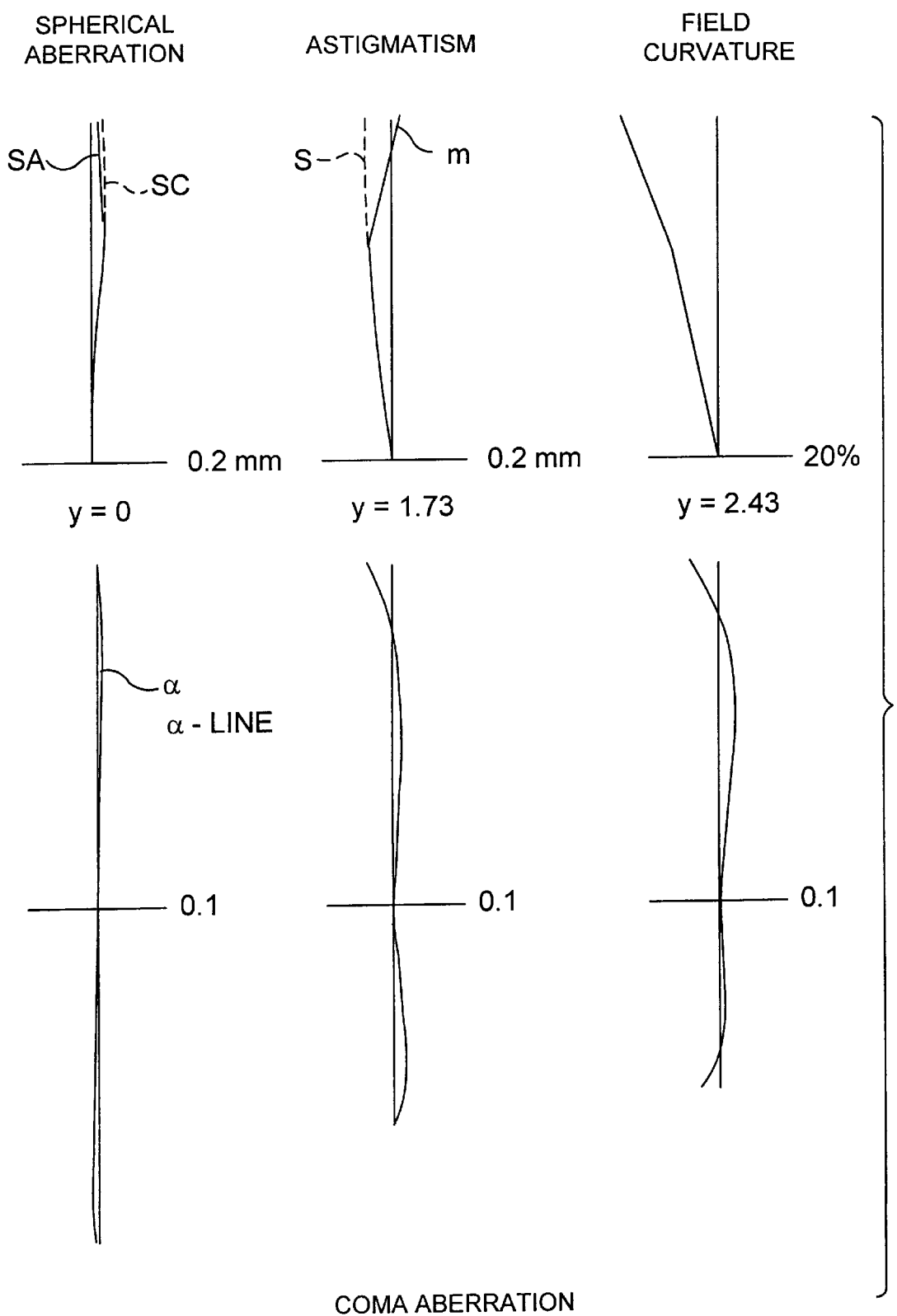
F I G. 6

WIDE-ANGLE LENS

This is a continuation-in-part of application Ser. No. 08/590,725, filed Jan. 24, 1996, now abandoned, which in turn, was a continuation of application Ser. No. 08/251,623, filed May 31, 1994, now abandoned, which, in turn, was continuation of application Ser. No. 07/738,854, filed Jul. 31, 1991, now abandoned.

BACKGROUND OF THE INVENTION

1. Field of the Invention

The invention relates to a wide-angle lens. More particularly, the invention relates to a wide angle lens having particular application to CCD-type cameras.

2. Background Prior Art

Lately, small-sized wide-angle lenses have become increasingly used in ½- and ⅓-inch CCD cameras which have recently been put into use.

Five-element wide-angle lenses are a common known type of such small-sized lenses.

However, such wide-angle lenses have practical limitations in size, weight and cost because they employ as many as five lens elements.

OBJECT OF THE INVENTION

The present invention was designed to solve the problems mentioned above. Its primary object, therefore, is to provide a novel wide-angle lens which can easily be decreased in size and weight and manufactured at a low cost.

For a better understanding of the present invention, reference is made to the following description and accompanying drawings while the scope of the invention will be pointed out in the appended claims.

BRIEF DESCRIPTION OF THE DRAWINGS

FIGS. 6 to 10 show aberrations of embodiments 1 to 5, respectively.

DESCRIPTION OF INVENTION AND PREFERRED EMBODIMENTS

Figure 1:
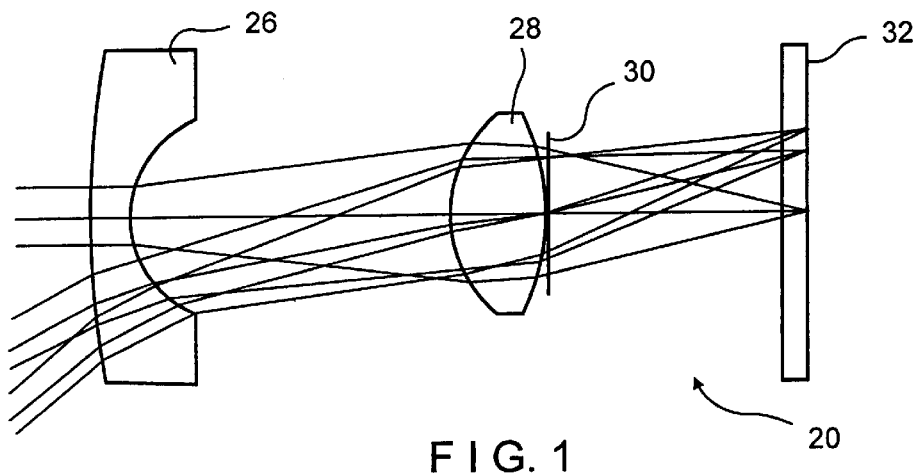
FIGS. 1 to 5 show the lens construction of corresponding embodiments 1 to 5.

The wide-angle lens system 20 according to the invention comprises a first lens element and a second lens element which are located on object and image (picture) sides, respectively. In the drawings, a first lens element is designated as 26 and a second lens element is designated as 28. The first lens element 26 is a meniscus type having a negative refractive power and the second lens element 28 is a two sided convex type having a positive refractive power, one or more of lens surfaces of lens elements 26, 28 being made aspherical.

The wide-angel lens system 20 can be used in ½- and ⅓-inch CCD cameras, for example.

The quantity of the component lens element of the wide-angle lens system 20 according to the present invention is thereby reduced to two. In order to secure high performance with the small quantity of lens elements, however, they are made aspherical.

In order to make its performances more effective, the wide-angle lens according to the invention is made to satisfy the following requirements.

$$|f_1| < D \quad (1)$$

wherein ($f_1$) is the focal length of the first lens element 26 and D is the distance between the principal points of the first and second lens elements 26, 28.

When satisfying requirement (1), the wide-angle lens system 20 permits its back-focus to be made two times longer despite its short focal length.

$$-1.5 < r_2 / \{(n_1-1)f_1\} < -0.5 \quad (2)$$

wherein ($r_2$) is the curvature radius of the image-side surface of the first lens element 26 and ($n_1$) is the refractive index of the material from which the first lens element 26 was constructed.

When satisfying requirement (2), the wide-angle lens system 20 permits astigmatism to become positively large or negatively large above the upper limit of requirement (2) or below its lower limit respectively.

$$-10 < K_4 < -1 \quad (3)$$

wherein $K_4$ is the conical reflection constant when the image-side surface of the second lens element 28 is aspherical.

When satisfying requirement (3), the wide-angle lens system 20 permits spherical aberration to be well corrected. Namely, spherical aberration becomes negatively large or positively large above the upper limit of requirement (3) or below its lower limit respectively.

$$-2 < f_1/f_2 < -1 \quad (4)$$

wherein ($f_2$) is the focal length of the second lens element 28.

When satisfying requirement (4), the wide-angle lens system 20 permits field curvature to be well corrected. Namely, field curvature becomes positive or negative above the upper limit of requirement (4) or below its lower limit respectively When not satisfying requirement (4), its lowers performance of the lens system 20.

The wide-angle lens system 20 according to the invention permits achromatism even when its first and second lens elements 26, 28 are made from the same material.

When the first and second lens elements 26, 28 are made from acryl (PMMA), the wide-angle lens system 20 permits material and manufacturing costs to be reduced further.

The invention will be more fully understood by describing five embodiments as follows.

It is assumed that the first lens surface counted from the object side (including lens surface, diaphragm and CCD cover glass) has a curvature radius $r_i$ (i=1–7) and a distance $d_i$ (i=1–5) is given between the (i)-th and (i+1)-th surfaces on the optical axis. Formula j=1, 2 represent the first and second lens elements respectively, j=3 the above mentioned cover glass, ($n_j$) refractive index of the material of the lens elements and cover glass j=1–3.

Aspherical surface of the lens elements of the wide-angle lens is obtained by revolving curve:

$$X = \left[ CY^2 / \{1 + \sqrt{1 - (K+1)C^2Y^2}\} \right] + A_4 Y^4 + A_6 Y^6$$

about the optical axis (X) with optically-axial coordinate and the coordinate orthogonal therewith given symbols X and Y respectively, optically-axial curvature C, conical reflection constant K, $A_4$, $A_6$ quarternary and hexanary aspherical coefficients, and its configuration is specified by giving conical reflectin constant K ans aspherical coefficients $A_4$, $A_6$.

Embodiment 1 f=3.3 mm, F/No=1.8

Picture size: 1/3 inch (diagonal distance: 5.5 mm)

| i | $r_i$ | $d_i$ | j | $n_j$ |
|---|---|---|---|---|
| 1 | 40.00 | 1.00 | 1 | 1.491 |
| 2 | 3.16 | 8.50 | | |
| 3 | 4.38 | 2.50 | 2 | 1.491 |
| 4 | −5.03 | 0.00 | | |
| 5 | (Diaphragm) | 6.22 | | |
| 6 | ∞ | 0.70 | 3 | 1.5168 |
| 7 | ∞ | | | |

Aspherical surface: $r_4$

K=−4.16934

$A_4=2.19540\times10^{-3}$, $A_6=2.19540\times10^{-3}$ $f_1=-7.04$, $f_2=5.22$, $D=8.68$, $r_2/\{(n_1-1)f_1\}=-0.91$ $f_1/f_2=-1.35$ The first and second lens elements 26, 28 were made from PMMA (acryl). The configuration of the lens and associated light paths according to the first embodiment are illustrated in FIG. 1 and the aberrations of the first embodiment are illustrated in FIG. 6. The coma aberration shown therein is obtained in connection with (d)- line.

Embodiment 2 f=5.0 mm, F/No=1.8

Picture size: 1/2 inch (diagonal distance: 8.0 mm)

| i | $r_i$ | $d_i$ | j | $n_j$ |
|---|---|---|---|---|
| 1 | 100.00 | 1.00 | 1 | 1.491 |
| 2 | 4.32 | 12.00 | | |
| 3 | 7.32 | 3.00 | 2 | 1.491 |
| 4 | −7.05 | 0.00 | | |
| 5 | (Diaphragm) | 10.58 | | |
| 6 | ∞ | 0.70 | 3 | 1.5168 |
| 7 | ∞ | | | |

Aspherical surface: $r_4$

K=−2.70060

Figure 2:
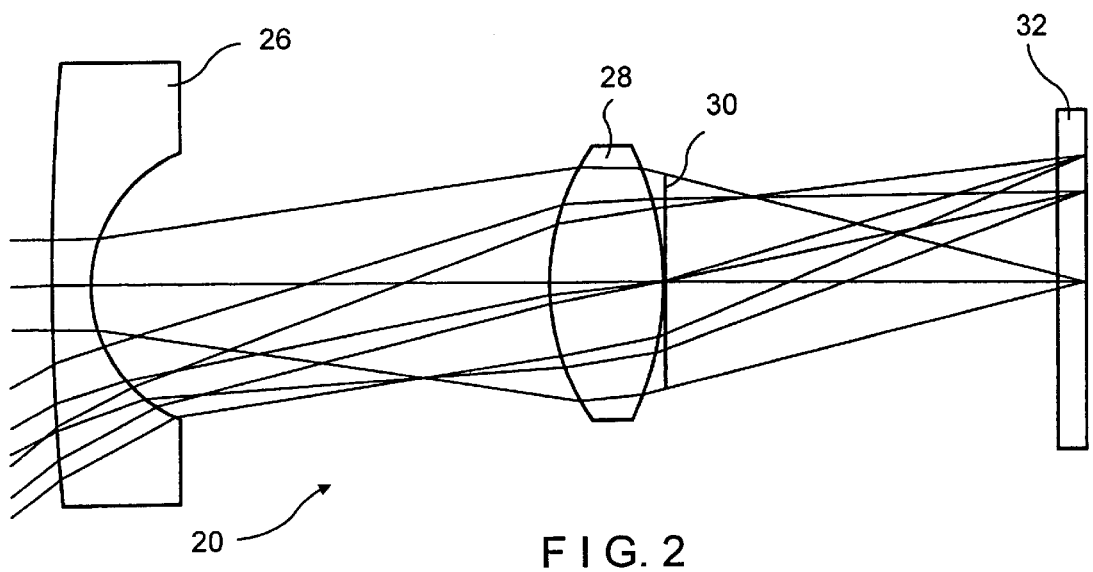
Figure 7:
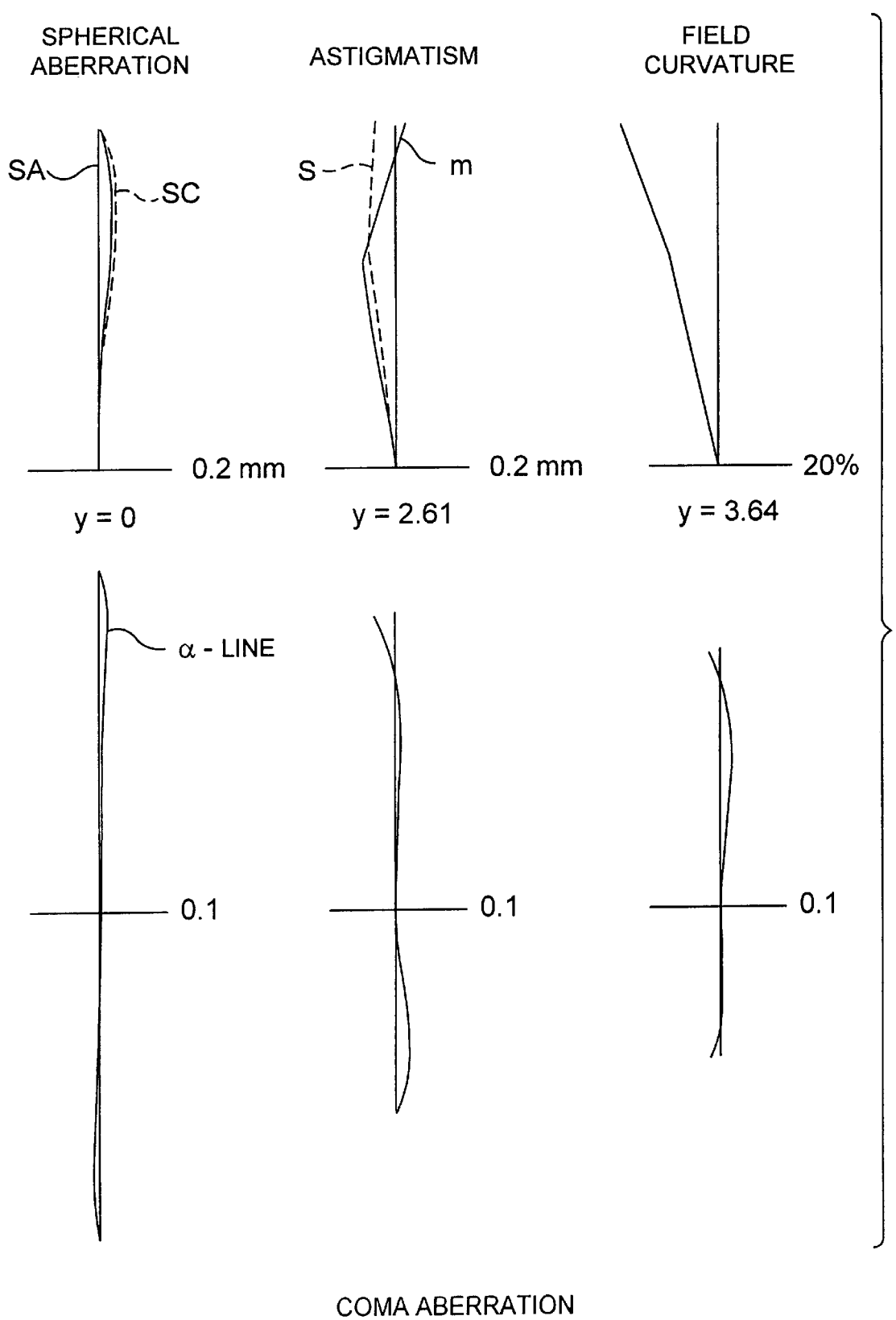

$A_4=6.15920\times10^{-4}$, $A_6=4.25890\times10^{-6}$ $f_1=-9.21$, $f_2=7.84$, $D=13.16$, $r_2/\{(n_1-1)f_1\}=-0.95$ $f_1/f_2=-1.17$ The first and second lens elements 26, 28 were made from PMMA (acryl). The configuration of the lens and associated light paths according to the second embodiment are illustrated in FIG. 2 and the aberrations of the second embodiment are illustrated in FIG. 7. The coma aberration shown therein is obtained in connection with (d)- line.

Embodiment 3 f=3.3 mm, F/No=1.8

Picture size: 1/3 inch (diagonal distance: 5.5 mm)

| i | $r_i$ | $d_i$ | j | $n_j$ |
|---|---|---|---|---|
| 1 | 20.00 | 1.00 | 1 | 1.5168 |
| 2 | 3.11 | 8.50 | | |
| 3 | 5.16 | 2.50 | 2 | 1.5168 |
| 4 | −4.64 | 0.00 | | |
| 5 | (Diaphragm) | 6.15 | | |
| 6 | ∞ | 0.80 | 3 | 1.5168 |
| 7 | ∞ | | | |

Aspherical surface: $r_3$

K=−1.76816

$A_4=2.20288\times10^{-5}$, $A_6=-6.86197\times10^{-7}$

Aspherical surface: $r_4$

K=−2.83668

Figure 3:
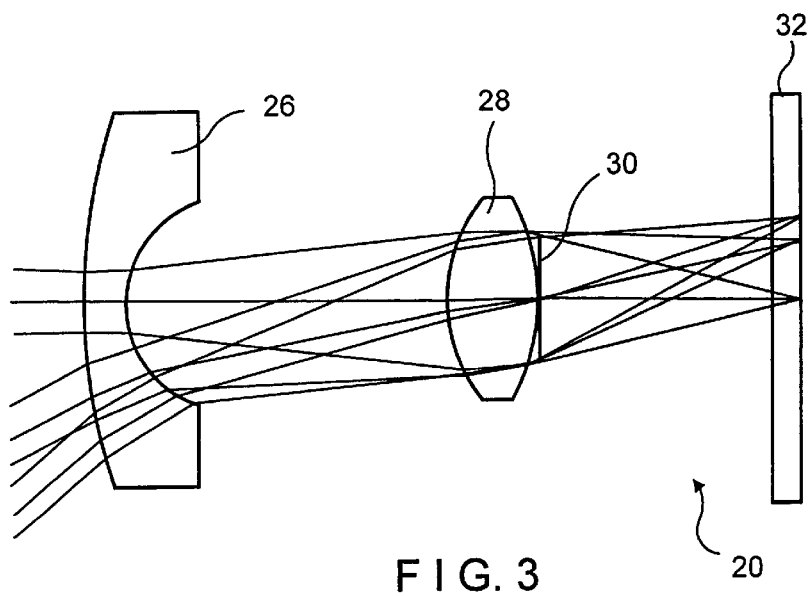
Figure 8:
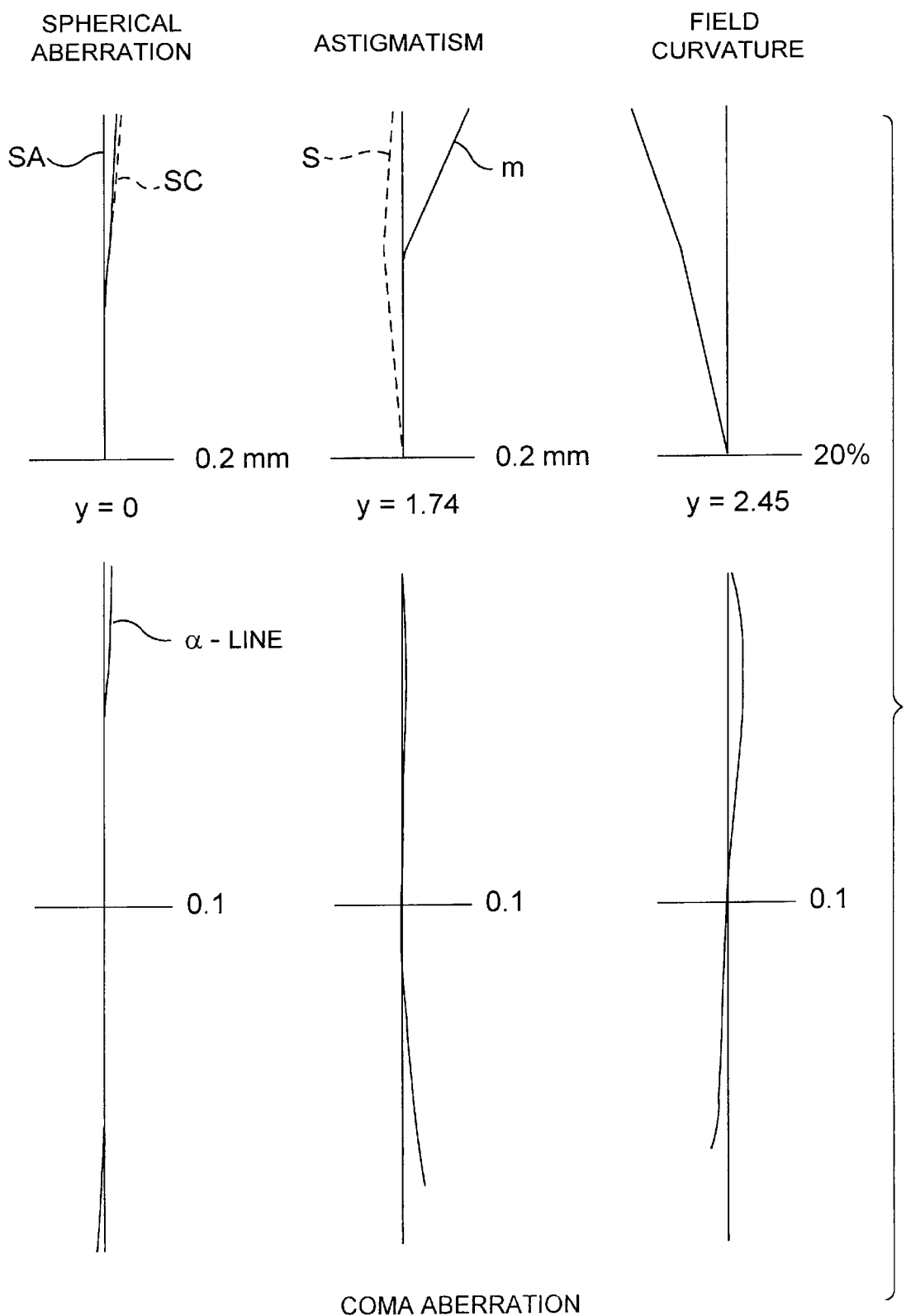

$A_4=-6.15852\times10^{-6}$, $A_6=2.98626\times10^{-7}$ $f_1=-7.28$, $f_2=5.18$, $D=9.33$, $r_2/\{(n_1-1)f_1\}=-0.83$ $f_1/f_2=-1.41$ The first and second lens elements 26, 28 and cover glass 32 were made from the same material (BK7). The configuration of the lens and associated light paths according to the third embodiment are illustrated in FIG. 3 and the aberrations of the third embodiment are illustrated in FIG. 8. The coma aberration shown therein is obtained in connection with (d)- line.

Embodiment 4 f=5.0 mm, F/No=3.5

Picture size: 1/3 inch (diagonal distance: 5.5 mm)

| i | $r_i$ | $d_i$ | j | $n_j$ |
|---|---|---|---|---|
| 1 | 16.500 | 1.500 | 1 | 1.49091 |
| 2 | 2.663 | 6.000 | | |
| 3 | 5.050 | 2.000 | 2 | 1.49091 |
| 4 | −5.328 | 0.200 | | |
| 5 | (Diaphragm) | 5.875 | | |
| 6 | ∞ | 4.600 | 3 | 1.51680 |
| 7 | ∞ | | | |

Aspherical surface: $r_3$

K=−2.27678

$A_4=0$, $A_6=$

Aspherical surface: $r_4$

K=−9.5

$A_4=0$, $A_6=0$ $f_1=-6.708$, $f_2=5.639$, $D=6.900$, $r_2/\{(n_1-1)f_1\}=-0.809$ $f_1/f_2=-1.190$

Figure 4:
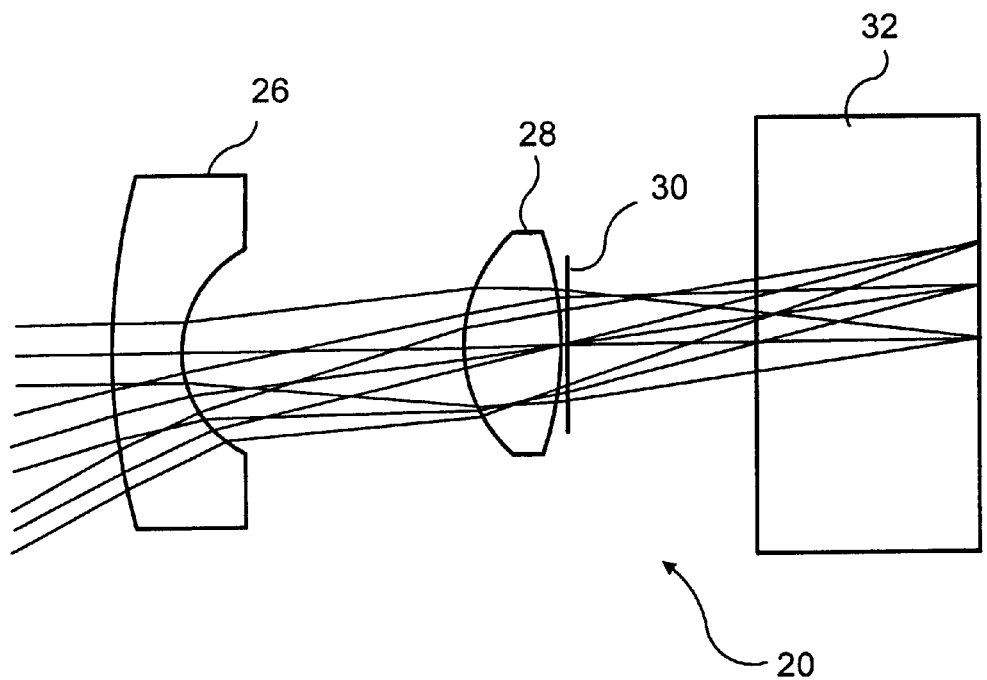
Figure 9:
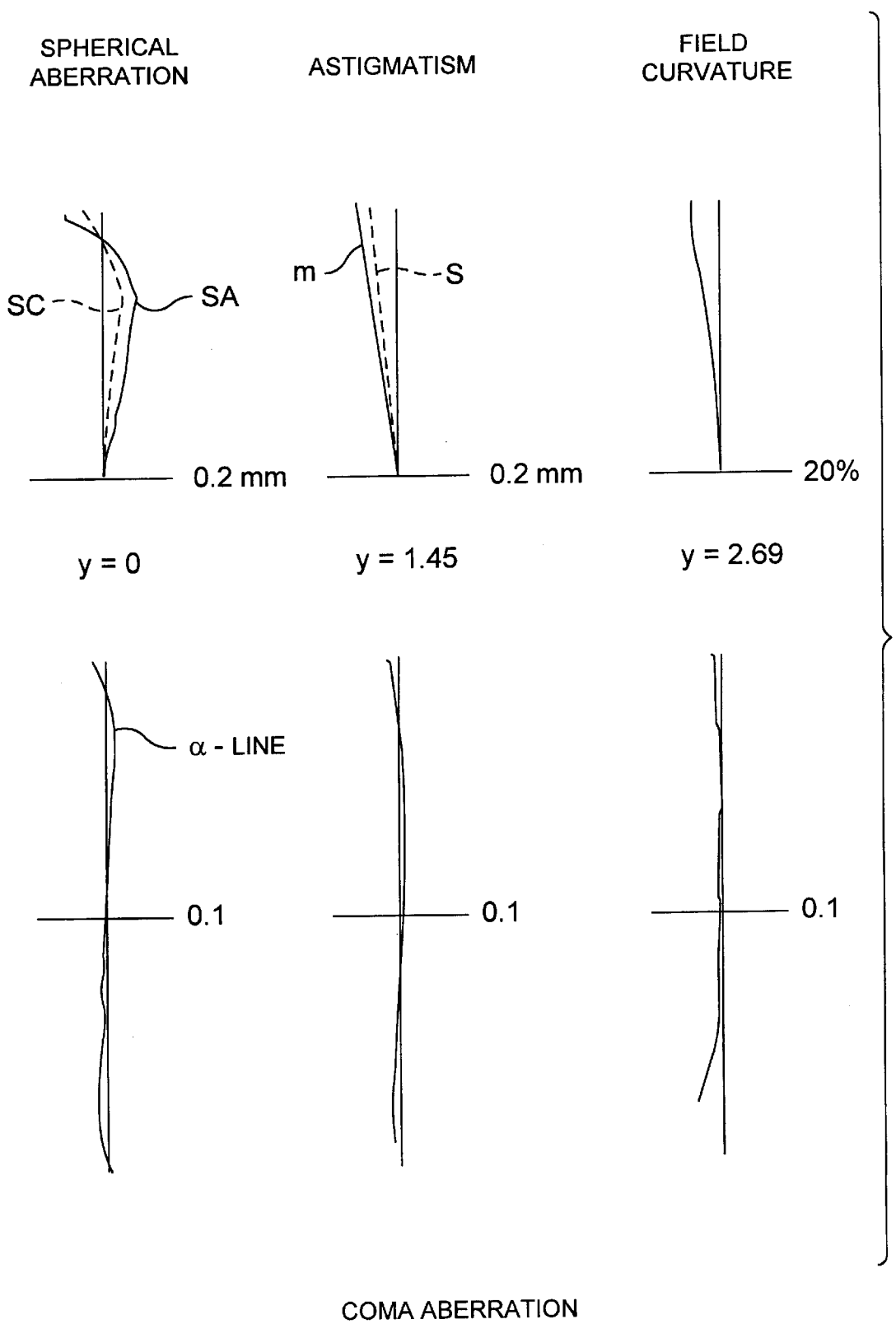

The first and second lens elements 26, 28 were made from PMMA (acryl). The configuration of the lens and associated light paths according to the fourth embodiment are illustrated in FIG. 4 and the aberrations of the fourth embodiment are illustrated in FIG. 9. The coma aberration shown therein is obtained in connection with (d) - line.

Embodiment 5 f=5.0 mm, F/No=2.5

| Picture size: 1/3 inch (diagonal distance: 5.5 mm) | | | | |
|---|---|---|---|---|
| i | $r_i$ | $d_i$ | j | $n_j$ |
| 1 | 21.000 | 1.500 | 1 | 1.49091 |
| 2 | 2.805 | 6.800 | | |
| 3 | 8.403 | 2.000 | 2 | 1.49091 |
| 4 | −4.382 | 0.00 | | |
| 5 | (Diaphragm) | 9.386 | | |
| 6 | ∞ | 0.800 | 3 | 1.51680 |
| 7 | ∞ | | | |

Figure 5:
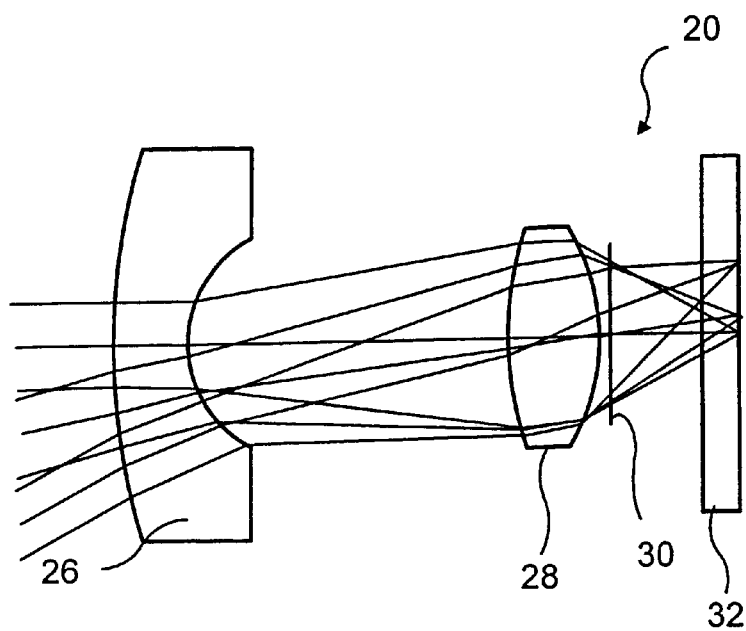
Figure 10:
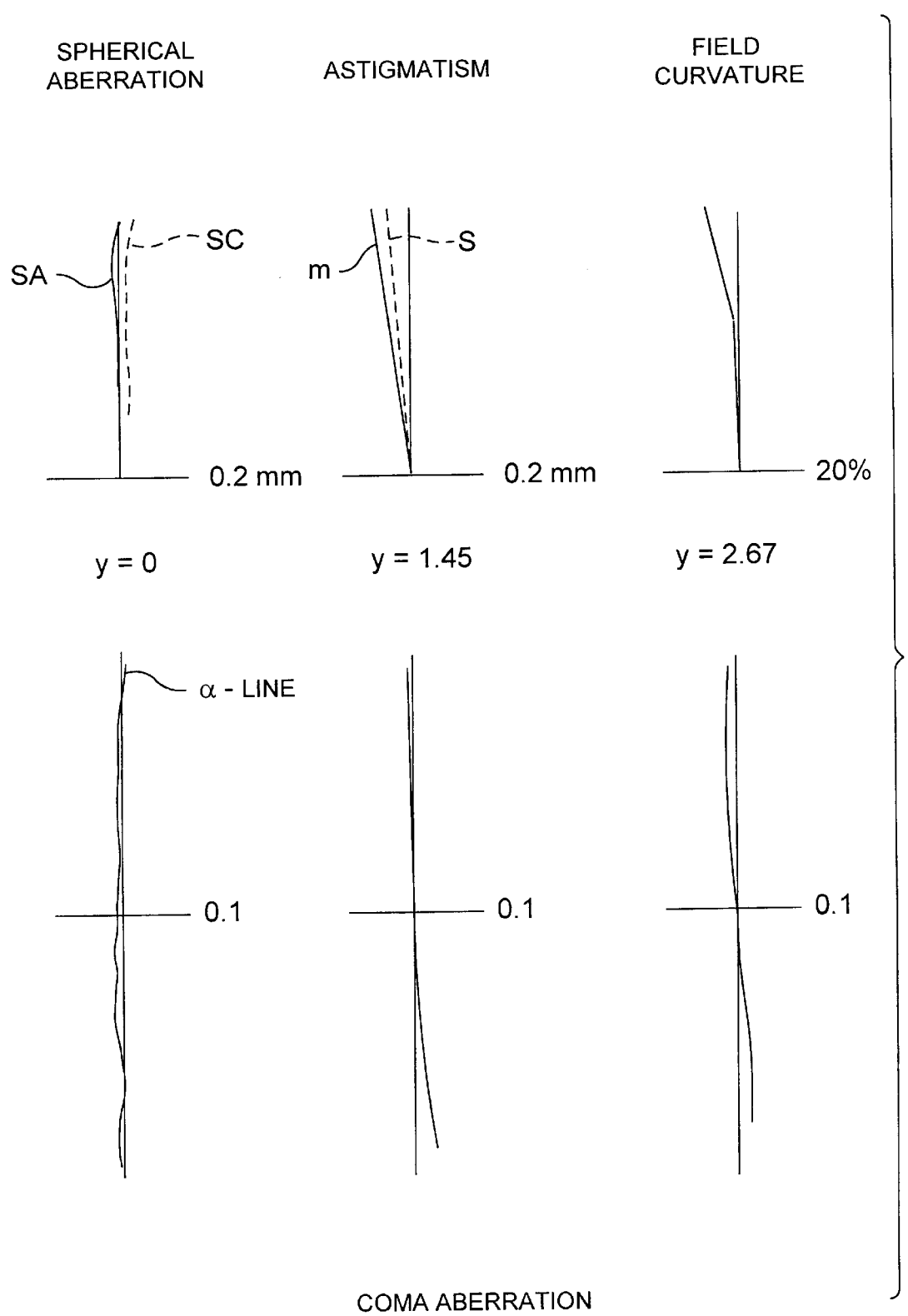

Aspherical surface: $r_3$
  K=−5.54774
  $A_4=0, A_6=0$
Aspherical surface: $r_4$
  K=−1.2
  $A_4=0, A_6=0$
  $f_1=-6.779, f_2=6.095, D=7.900, r_2/\{(n_1-1)f_1\}=-0.843$
  $f_1/f_2=-1.112$ The first and second lens elements 26, 28 were made from PMMA (acryl). The configuration of the lens and associated light paths according to the fifth embodiment are illustrated in FIG. 5 and the aberrations of the fifth embodiment are illustrated in FIG. 10. The coma aberration shown therein is obtained in connection with (d) - line.

FIGS. 1 through 5 show the layout of the lens elements of the wide-angle lens system of the Embodiments 1 through 5 and light paths therein. In FIGS. 1 through 5 numeral 26 is a first lens element, 28 a second lens element, 30 a diaphragm and 32 a cover glass.

As is clear from the drawings, all the embodiments show good performances.

In the aberration diagrams, consideration is given to the presence of the cover glass.

While the foregoing description and drawings represent the preferred embodiments of the present invention, it will be obvious to those skilled in the art that various changes and modifications may be made therein without departing from the true spirit and scope of the present invention.

What is claimed is:

1. A wide angle lens system comprising:
   a first lens element and a second lens element which are located on the object side and image side respectively, said first lens element being of a meniscus type having a negative refractive power and said second lens element being of a two-sided convex type having a positive refractive power, at least one surface of said lens elements being aspherical, said wide angle lens system having no more than two lens elements and wherein
   $|f_1|<D$;
   $[-1.5<r_2/\{(n_1-1)f_1\}<-0.5;$ and
   $-2<f_1/f_2\leq\_1]$
   $-1.5<r_2/\{(n_1-1)f_1\}-0.5;$ and
   $-2<f_1/f_2<-1$
   where $(f_1)$ is the focal length of the first lens element and D is the distance between a back principal point of the first lens element and a front principal point of the second lens element, where $(r_2)$ is the curvature radius of the image-side surface of the first lens element, where $(n_1)$ is the refractive index of the material of the first lens element, and where $(f_2)$ is the focal length of the second lens element.

2. The wide angle lens system of claim 1, wherein $-10<K_4<-1$ where $(K_4)$ is the conical reflection constant when the image-side surface of the second lens element is aspherical.

3. The wide angle lens system of claim 2, wherein said lens elements are made of plastic.

4. The wide angle lens system of claim 3, wherein said lens elements are made from acryl.

5. The wide angle lens system of claim 1, wherein said lens elements are made of plastic.

6. The wide angle lens system of claim 5, wherein said lens elements are made from acryl.

7. The wide angle lens system of claim 5, including a diaphragm and a cover glass for a CCD layer on the image side, said diaphragm being between said second lens element and said cover glass.

8. The wide angle lens system of claim 1, including a diaphragm and a cover glass for a CCD layer on the image side, said diaphragm being between said second lens element and said cover glass.

9. The wide angle lens system of claim 8, wherein said first and second lens elements are constructed of the same material as said cover glass.

10. In a camera having a wide angle lens system, a diaphragm and a plane surface for forming an image, the improvement comprising:
    that said wide angle lens system comprises:
    a first lens element and a second lens element which are located on the object side and image side respectively, said first lens element being of a meniscus type having a negative refractive power and said second lens element being of a two-sided convex type having a positive refractive power, at least one surface of said lens elements being aspherical, said wide angle lens system having no more than two lens elements and wherein
    $|f_1|<D$;
    $-1.5<r_2/\{(n_1-1)f_1\}<-0.5;$ and
    $-2<f_1/f_2<-1$
    where $(f_1)$ is the focal length of the first lens element and D is the distance between a back principal point of the first lens element and a front principal point of the second lens element, where $(r_2)$ is the curvature radius of the image-side surface of the first lens element, where $(n_1)$ is the refractive index of the material of the first lens element, and where $(f_2)$ is the focal length of the second lens element.

11. The camera of claim 1 wherein said camera is of the CCD type and wherein a cover glass for CCD elements is arranged on the image side, said diaphragm being disposed between said second element and said cover glass.

12. The camera of claim 11 wherein said first and second elements are constructed of the same material as said cover glass.

13. The camera of claim 1 wherein said first and second elements are made of plastic.

14. The camera of claim 10 wherein $-10<K_4<-1$ where $K_4$ is a conical reflection constant when the image-side surface of said second lens element is aspherical.

15. In a camera having a wide angle lens system, a diaphragm and a plane surface for forming an image, the improvement comprising:

that said wide angle lens system has a first lens element and a second lens element which are located on an object side and image side respectively, said first lens element being of a meniscus type having a negative refractive power and said second lens element being of a two-sided convex type having a positive refractive power, at least one surface of said lens elements being aspherical wherein $$-1.5 < r_2/\{(n_1-1)f_1\} < -0.5$$

wherein $(r_2)$ is the curvature radius of the image side surface of the first lens element, $(f_1)$ is the focal length of the first lens element and $(n_1)$ is the refractive index of the material of the first lens element.

* * * * *